July 5, 1966   W. W. POWELL, JR   3,258,846
DRYING OF WEB MATERIALS
Filed May 1, 1963    2 Sheets-Sheet 1
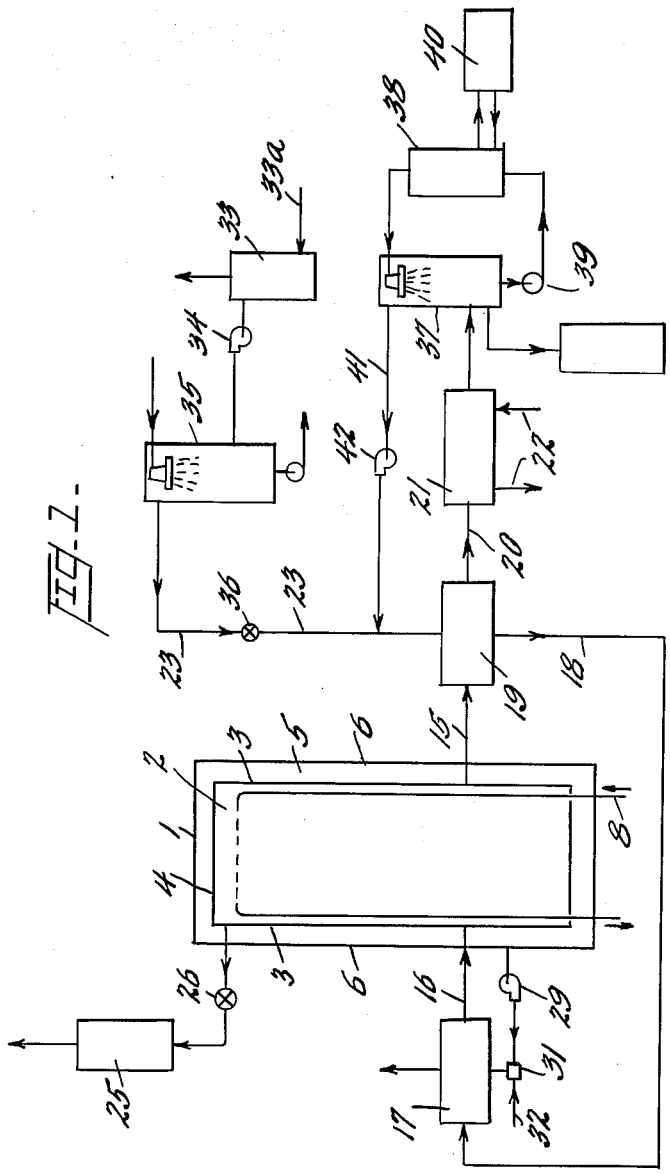
INVENTOR
William Ward Powell, Jr.,
BY Hugo E. Weisberger
ATTORNEY

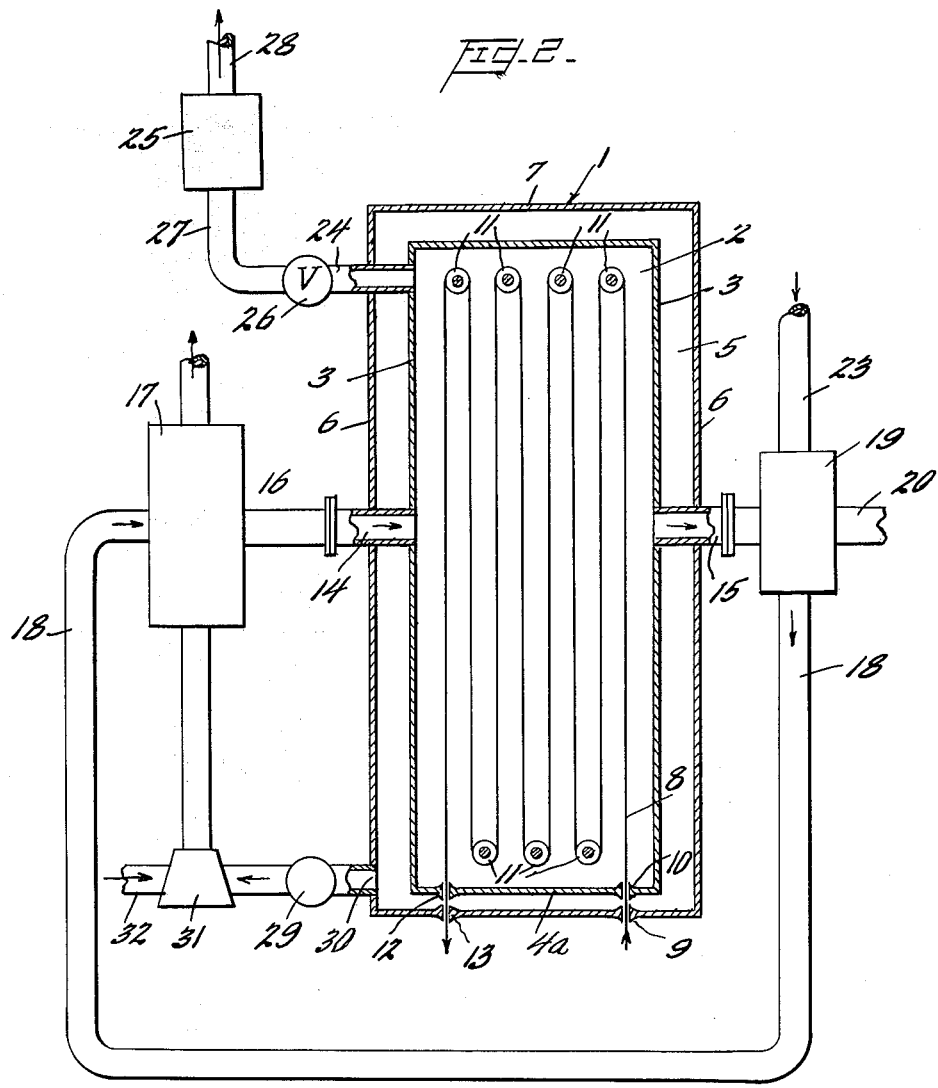

United States Patent Office 3,258,846
Patented July 5, 1966

3,258,846
DRYING OF WEB MATERIALS
William Ward Powell, Jr., R.F.D. 1, Clinton, Pa.
Filed May 1, 1963, Ser. No. 277,351
7 Claims. (Cl. 34—23)

This invention relates to the drying of web materials coated or impregnated with compositions including a volatile organic solvent or diluent. More particularly the invention concerns a method and apparatus for the drying of such web materials with safe and economical disposal of leakage vapors of the solvent, while at the same time recovering the main body of the solvent. The invention is especially adapted to the continuous drying of freshly lacquered metal strip.

Drying of lacquered or painted metal strip is conventionally performed in an arrangement wherein the wet strip enters a drying chamber provided with guiding and supporting means for the strip in its passage through the chamber, such as, for example, upper and lower sets of rolls. The drying chamber is further provided with means for introducing a heated drying gas, normally air, which will volatilize the solvent or diluent, and for removing the gas mixture. Since the solvent vapors are generally inflammable, it is customary to employ large quantities of air which dilute the solvent vapors below their lower explosive limits.

In the operation of drying systems of the type described, large amounts of solvent vapors are evolved, creating health and safety hazards within the plant, and air pollution problems in the surrounding area. Attempts have been made to combat these difficulties in industrial installations by collecting the vapors and venting them through a stack to the atmosphere, or by employing catalytic treatments intended to burn the vapors. These attempts have not thus far produced a satisfactory solution to the problem of the disposal of solvent vapors and gases. Inefficient dilution is achieved with stack disposal, while catalyst systems soon become poisoned and ineffective.

It is a primary object of the present invention to provide an air pollution control method whereby the vapors of volatile solvents and diluents formed in the drying of web materials are efficiently and economically disposed, with substantial reduction or elimination of hazards of inflammability and toxicity.

Another object of the invention is to provide an apparatus whereby wet coated strip materials may be continuously and rapidly dried, while eliminating air pollution due to leakage of solvent vapors, and recovering the solvents.

Another object is to provide an improved arrangement of a drying chamber and means for continuously moving wet strip material therethrough, collecting and burning leakage gases and recovering the heat from their combustion by indirect heat exchange with inert drying gas supplied to the drying chamber.

These and other objects will become apparent from the ensuing description and the accompanying drawings.

In the accompanying drawings:

FIGURE 1 is a diagram illustrating the relationship of the various elements of the drying, solvent recovery, and air pollution control system of the invention.

FIGURE 2 is a vertical, cross-sectional schematic view of the drying apparatus together with means for collecting and treating leakage vapors.

The novel method of the invention, in its broad aspect, contemplates the drying of wet web material coated or impregnated with a composition including a volatile solvent or diluent, comprising the steps of introducing the wet web into an enclosed drying zone, contacting the wet web in the drying zone with a drying gas at an elevated temperature whereby the volatile solvent or diluent is volatilized, the vapors thereof becoming admixed with the drying gas, said drying zone being itself at least partially enclosed within a vapor leakage collecting zone, removing the main portion of the solvent laden drying gas from the drying zone and separating solvent therefrom, and removing leakage vapors from said collecting zone, admixing said leakage vapors with a combustible gas, burning the resulting mixture, recovering the heat of combustion therefrom by indirect heat exchange with drying gas, and supplying said heated drying gas to said drying zone.

The method of the invention also contemplates the further steps of discharging the solvent laden drying gas from the drying zone, subjecting the solvent laden gas to indirect heat exchange with a supply of drying gas flowing toward the drying zone. This heat exchange will preferably take place preceeding the indirect heat exchange between the drying gas and the burnt leakage gas referred to previously. The partially cooled solvent laden drying gas is then further cooled by indirect heat exchange with a cooling liquid, such as water, to reduce the gas temperature to about 100° F.

The drying gas is preferably a relatively inert gas, such as flue gas, or a specially prepared atmosphere gas supplied by an inert gas generator of the type commonly employed for this purpose in metallurgical work.

The temperature of the drying gas, and hence of the drying zone, will depend upon the nature of the material to be dried, the type of coating or impregnating composition, and the kind and volatility of the solvent or diluent, but in general, an operating temperature between about 200° F. to about 600° F. may be considered illustrative.

The final cooling and stripping of the solvent laden drying gas is accomplished by direct heat exchange with a cooling liquid spray, which cools the solvent laden drying gas to a point at which substantially all the solvent or diluent condenses; a temperature of about 40° F. will illustrate typical operating conditions. The cooling liquid employed for this purpose can be a solvent-immiscible liquid with good heat transfer properties, such as water, or it can be the solvent or diluent itself, provided that it possesses favorable heat transfer characteristics. The condensed solvent or diluent is, where necessary, separated and recovered.

The cooled and stripped inert drying gas is reused, if necessary with the addition of make-up quantities of fresh inert gas to offset process losses, and the inert gas is recycled to the drying zone via the previously mentioned indirect heat exchange step with solvent laden drying gas leaving the drying zone.

The apparatus and the manner of its operation will be understood by reference to the drawings, in which like numerals designate like parts, and which exemplify the control of air pollution, and the recovery of solvent, in the drying of freshly lacquered steel strip.

Referring to FIGURE 1 the apparatus comprises a drying oven designated generally as 1, including, in the embodiment shown, a drying chamber 2 having walls 3 and top 4a, completely enclosed by jacket 5, having walls 6 and top 7. The chamber 2 forms a drying zone, and jacket 5 forms a collecting zone for accumulating leakage gases from chamber 2. It will be understood that jacket 5 may either enclose the entire drying chamber 2, as shown, or that it may enclose only a portion thereof, for example the lower portion containing the means admitting and withdrawing the metal strip from the drying chamber. Thus, in effect, the jacket 5 serves as a vestibule through which the strip must enter and leave the drying oven before it reaches the interior of the drying chamber.

Metal strip 8 bearing on its surface a wet coating composition such as a lacquer, is shown entering the drying oven through an inlet 9, passing through jacket 5, and thence through a suitable seal 10, which may be of conventional type, such as a liquid seal or a set of opposing rollers. The interior of drying chamber 2 is provided with upper and lower sets of rolls 11, which support and guide the metal strip through several passes, as shown in FIGURE 2. The dried strip leaves the drying oven via seal 12, and outlet 13.

The drying apparatus is further provided with inlet tube 14 and outlet tube 15, both communicating with the interior of drying chamber 2 and serving, respectively, to supply heated drying gas and to remove solvent laden drying gas. The inlet tube 14 is connected via conduit 16 to indirect heat exchanger 17, to which incoming drying gas is fed via conduit 18. Solvent laden drying gas leaving the drying chamber via outlet 15 passes into indirect heat exchanger 19 connected thereto and thence passes via conduit 20 to indirect heat exchanger 21 connected thereto, heat exchanger 21 being provided with cooling coil 22. Drying gas is fed into heat exchanger 19 via conduit 23 and emerges via conduit 18.

The drying oven is equipped with an arrangement for scavenging the drying chamber 2 and circulating system during shut-down, as well as for starting-up operations, comprising a pipe 24 in communication with the interior of drying chamber 2, connecting same with a water cooled activated carbon absorber 25 via valve 26 and conduit 27. The carbon absorber is vented to the stack via conduit 28.

A certain amount of leakage of oven gases and solvent vapors passing from drying chamber 2, which is maintained at an elevated temperature and at a slight positive (superatmospheric) pressure of drying gas takes place into collecting jacket 5 via the seals 10 and 12 through which the metal strip enters and leaves the drying chamber. The jacket 5 is maintained under subatmospheric pressure by means of the suction of blower 29, which is connected thereto via conduit 30 provided for the exit of accumulated leakage gases. The leakage gases are fed into burner 31, where they are burned in admixture with fuel gas and air supplied to burner 31 via line 32. The burnt gases pass through indirect heat exchanger 17, exchanging heat with incoming drying gas, and thence are vented to the stack, thus utilizing the heat of combustion of the leakage gases. If desired, further heat recovery may be obtained by including an economizer in the stack system to heat water or to generate process steam.

Because of the inflammability and potential explodability of the solvent vapors in the presence of the proper amount of air, it is desirable to operate the drying oven in inert atmosphere. Inert gas is conveniently provided by means of a special atmosphere type generator 33 to which fuel such as gas, oil, or powdered coal or coke, is supplied via line 33a, and which may be vented to the stack. The inert drying gas thus generated is transported by blower 34 to a scrubber 35 which water-washes out any solid particles, and supplies clean inert gas to the drying oven via conduit 23 and control valve 36. The inert gas supply from the generator is combined with recycled inert gas returning from the solvent recovery system, as explained below, passing first through heat exchanger 19, where it is heated by emerging solvent laden gases, and then further heated in heat exchanger 17 by burnt leakage gases, to attain the desired drying gas temperature of approximately 200° F. to 600° F.

In heat exchanger 21, the solvent laden drying gases are reduced in temperature to about 100° F. by water cooling. The solvent laden gases then pass to a spray washing condenser 37 operated at about 40° F. cooling the gases to this temperature and simultaneously condensing the vapors of solvent or diluent. The spray water is circulated through condenser 37 from a refrigerated heat exchanger 38 by means of pump 39. Heat exchanger 38 is served by a refrigerator unit shown generally at 40. Stripped inert gas emerging from condenser 37 is fed via conduit 41 and blower 42 into the gas feed line 23, and combined with make-up inert gas from the gas generating system as previously described.

In the initial operation, metal strip 8 is fed into the drying chamber 2 and trained over the guide rollers 11, which may be power driven by means not shown. The system is filled with inert gas via blower 34 and valve 36 to purge the drying chamber and the circulation system of oxygen. When the purging is sufficient, inert gas is supplied to the drying chamber via blower 42, being heated to the drying temperature in heat exchange 17, to which heat is supplied by the combustion of gas or oil fuel at burner 31, until the system is brought into general operating condition.

It will be apparent that the apparatus of the invention is adapted to continuous operation, requiring a minimum of interruptions, and safely and effectively disposing of dangerous leakage gases. While the drying of painted metal strip has been set forth for purposes of illustration, it will be understood that the method and apparatus of the invention are capable of a wide variety of applications, including the drying of coated or impregnated materials which may be textile fabrics, and paper as well as metals, and the coating or impregnating agents may be rubber, plastics, and the like as well as paints and lacquers.

I claim:

1. Method for drying wet web material coated or impregnated with a composition including a volatile solvent or diluent, comprising the steps of introducing the wet web into an enclosed drying zone, contacting the wet web in the drying zone with a drying gas at an elevated temperature whereby the volatile solvent or diluent is volatilized, the vapors thereof becoming admixed with the drying gas, said drying zone being itself at least partially enclosed within a vapor leakage collecting zone, removing the main portion of the solvent laden drying gas from the drying zone and separating solvent therefrom, and removing leakage vapors from said collecting zone, admixing said leakage vapors with a combustible gas, burning the resulting mixture, and recovering the heat of combustion therefrom by indirect heat exchange with drying gas, and supplying said heated drying gas to said drying zone.

2. The method of claim 1 in which the drying gas is an inert gas.

3. Method for drying wet web material coated or impregnated with a composition including a volatile solvent or diluent, comprising the steps of introducing the wet web into an enclosed drying zone, contacting the wet web in the drying zone with a drying gas at an elevated temperature whereby the volatile solvent or diluent is volatilized, the vapors thereof becoming admixed with the drying gas, said drying zone being itself at least partially enclosed within a vapor leakage collecting zone, removing the main portion of the solvent laden drying gas from the drying zone, and removing leakage vapors from said collecting zone, admixing said leakage vapors with a combustible gas, burning the resulting mixture, and recovering the heat of combustion therefrom by indirect heat exchange with drying gas, and supplying said heated drying gas to said drying zone, subjecting the solvent laden gas to indirect heat exchange with a supply of drying gas prior to heat exchange with the heat of combustion of the leakage vapors, and recovering solvent from said solvent laden gas.

4. The method of claim 3 in which the drying gas is stripped of solvent and recycled to the drying zone.

5. Apparatus for the drying of wet web material coated or impregnated with a composition including a volatile solvent or diluent comprising an enclosed drying chamber, means for continuously moving web material therethrough, means for admixing and removing drying gas to and from said chamber, a second chamber at least partially enclosing said drying chamber and adapted to collect leakage vapors from said drying chamber, means for removing said leakage vapors, means for burning said leakage vapors, and means for recovering the heat of combustion therefrom by indirect heat exchange with drying gas supplied to said drying chamber.

6. The apparatus of claim 5 which includes means for cooling solvent laden drying gases by heat exchange with incoming drying gas.

7. The apparatus of claim 5 in which the means for continuously moving web material comprises sets of guiding rolls.

References Cited by the Examiner
UNITED STATES PATENTS 1,742,099  12/1929  Robertson et al. _____ 34—150 X FREDERICK L. MATTESON, Jr., *Primary Examiner.*

WILLIAM F. O'DEA, *Examiner.*

C. R. REMKE, *Assistant Examiner.*